Oct. 5, 1948.  F. A. MANFREDI  2,450,674
MECHANICAL WALKING ANIMAL
Filed March 18, 1946  3 Sheets-Sheet 1
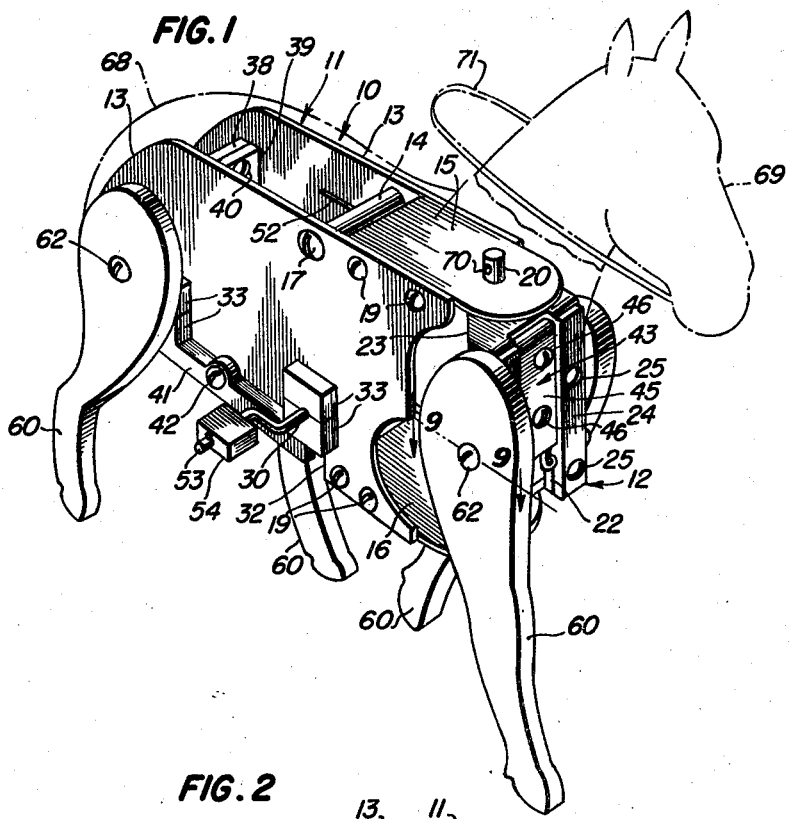
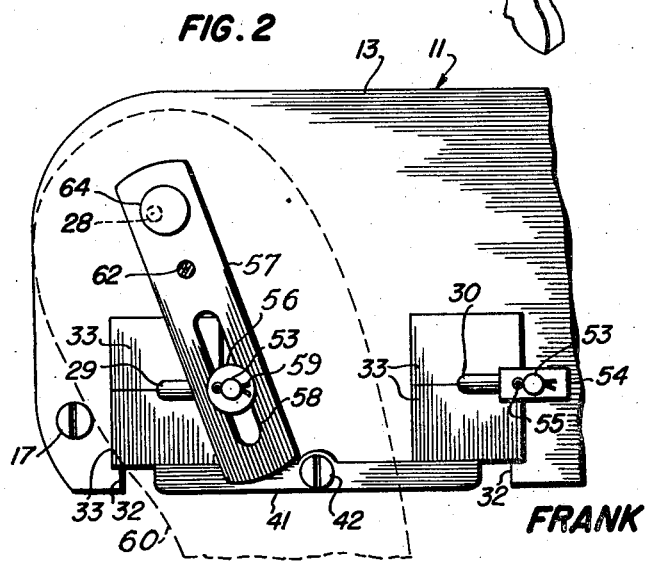
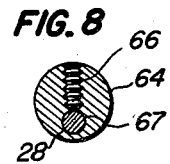
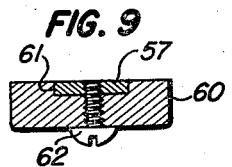
Inventor
FRANK A. MANFREDI
By Clarence A. O'Brien
and Harvey B. Jacobson
Attorneys

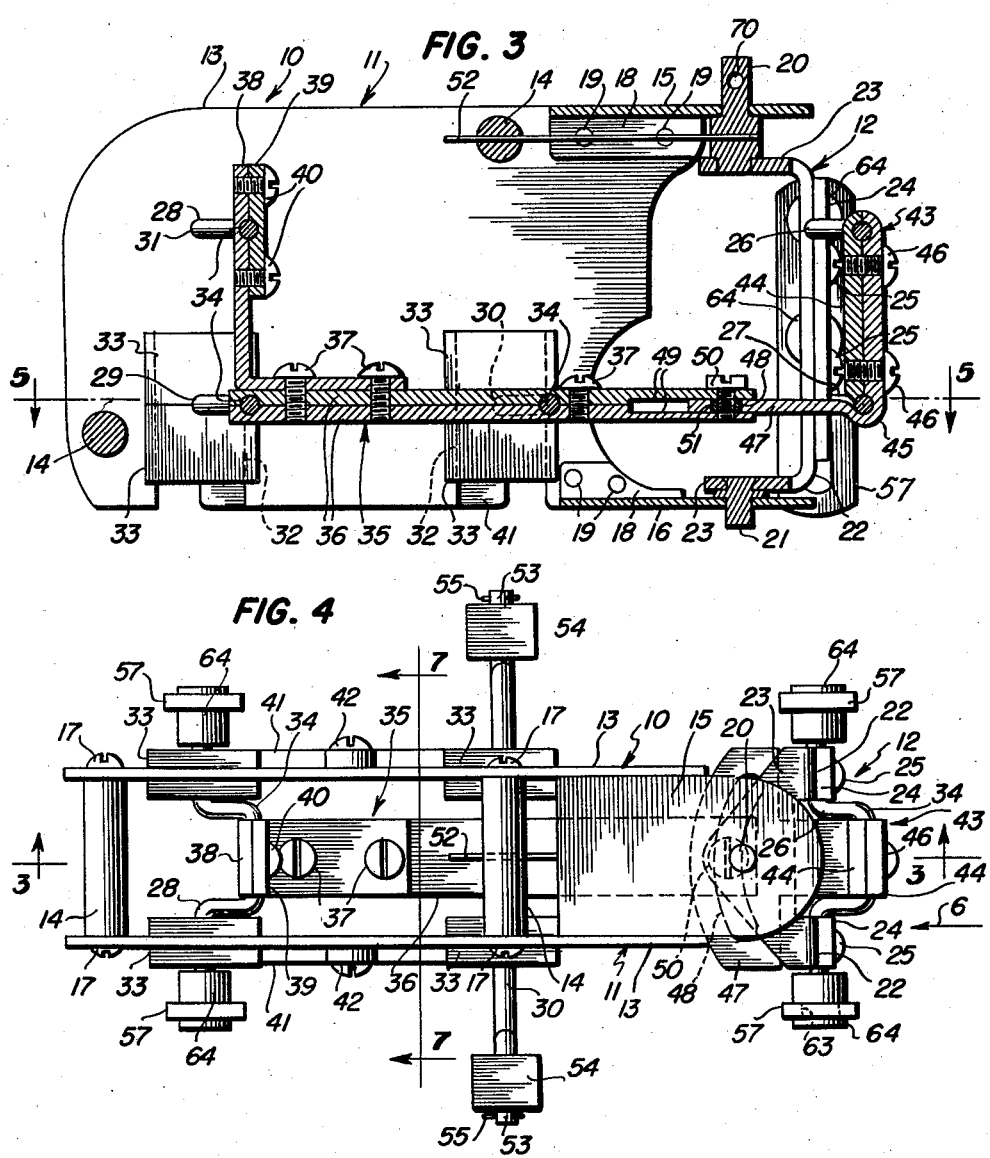

Oct. 5, 1948.  F. A. MANFREDI  2,450,674
MECHANICAL WALKING ANIMAL

Filed March 18, 1946  3 Sheets-Sheet 3

FRANK A. MANFREDI

By *Clarence A. O'Brien*
and *Harvey B. Jacobson*
Attorney

Patented Oct. 5, 1948

2,450,674

UNITED STATES PATENT OFFICE 2,450,674

MECHANICAL WALKING ANIMAL

Frank A. Manfredi, Gary, Ind.

Application March 18, 1946, Serial No. 655,172

12 Claims. (Cl. 280—1.17)

This invention relates to new and useful improvements and structural refinements in mechanical walking animals, more specifically, to a device of the character herein described, which may be manufactured in a sufficiently large size to carry a child on its back and in which such rider, by manipulating stirrup-like foot pedals, may cause the animal to walk effectively and realistically along the ground.

A further object of the invention is to provide such device with a steering mechanism actuated by pulling the conventional reins, thereby guiding the animal in the desired direction of travel.

Another object of the invention is to provide a mechanical walking animal which, by virtue of the construction above outlined, will offer a continuous source of recreational amusement to be enjoyed by younger and older children alike.

An additional object of the invention is to provide a walking animal which is easily and safely operated and which will not readily become damaged.

Another object of the invention is to provide a mechanical walking animal which, if desired, may also be manufactured in relatively smaller sizes, which need not be adapted to carry the person operating the same.

A still further object of the invention is to provide a walking animal which is of relatively simple construction and which may be readily disassembled for purposes of cleaning, inspection or repair.

With the above more important objects in view, and such other objects as may become apparent as this specification proceeds, the invention consists essentially of the arrangement and construction of parts as illustrated in the accompanying drawings, in which:

Figure 1 is a perspective view of the invention,

Figure 2 is a fragmentary side elevation thereof,

Figure 5:
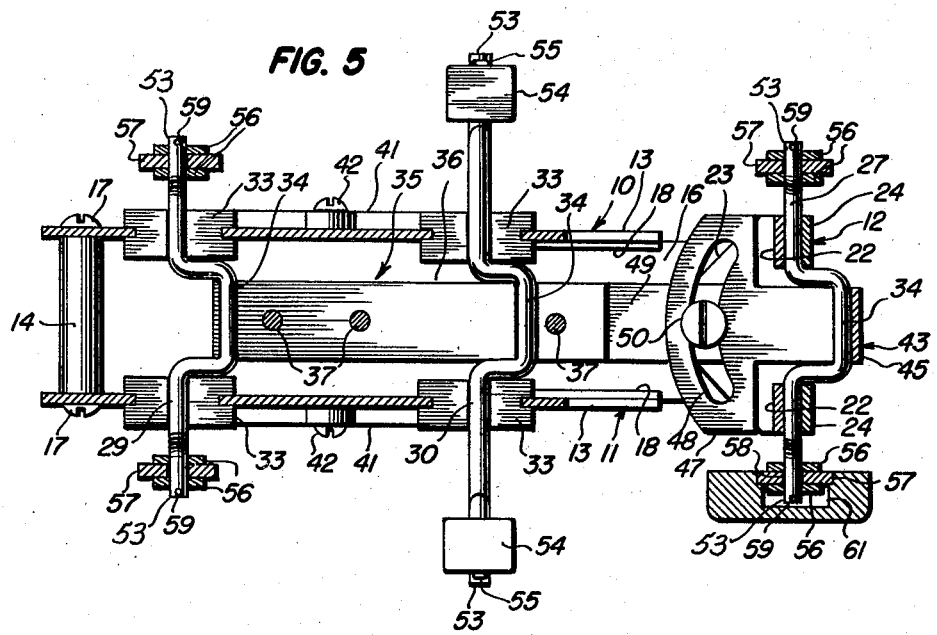
Figure 6:
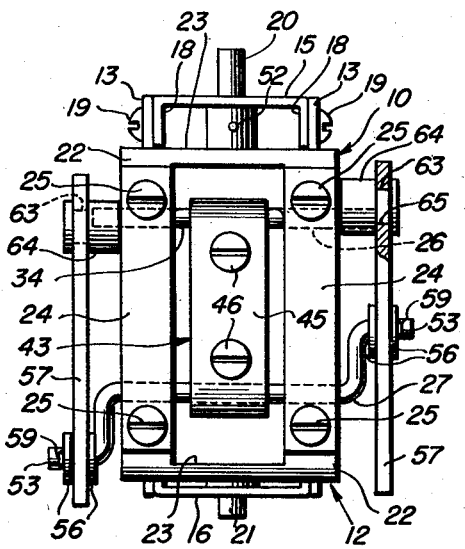
Figure 7:
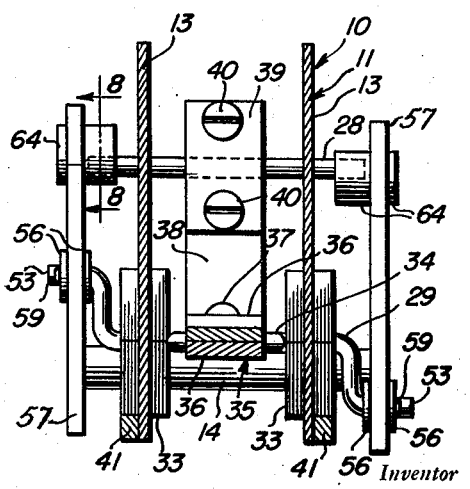

Figure 3 is a central, cross-sectional view of the body and breast portions of the animal, the same being taken in the plane of the line 3—3 in Figure 4, Figure 4 is a plan view of the subject illustrated in Figure 3, Figure 5 is a cross-sectional view, taken in the plane of the line 5—5 in Figure 3, Figure 6 is a front elevation, taken in the direction of the arrow 6 in Figure 4, Figure 7 is a cross-sectional view, taken in the plane of the line 7—7 in Figure 4, Figure 8 is a cross-sectional view, taken in the plane of the line 8—8 in Figure 7, and Figure 9 is a cross-sectional view, taken in the plane of the line 9—9 in Figure 1.

Like characters of reference are used to designate like parts in the specification and throughout the several views.

Referring now to the accompanying drawings in detail, the invention consists of a framework designated generally by the reference character 10 and comprising a body 11 and a breast portion 12. The body 11 consists of a pair of side plates 13 connected together in a spaced parallel relationship by means of the cross members 14 and the upper and lower plates 15, 16 respectively. The cross members 14 assume the form of cylindrical spacers suitably screw-threaded in the ends thereof to receive the mounting bolts 17 and the plates 15, 16 are provided with the side flanges 18, whereby they are secured to the plates 13 by the bolts 19.

The plates 15, 16 are formed with a pair of vertically aligned apertures, these being adapted to rotatably receive the upper and lower trunnions 20, 21 respectively, associated with the breast portion 12. This portion consists of the side members 22, angulated at the upper and lower ends thereof to provide the integral flanges 23 into which the trunnions 20, 21 are suitably pressed, as will be clearly apparent from the accompanying drawings. A strap 24 is secured to the front portion of each of the side members 22 by means of the bolts 25, the purpose thereof being hereinafter more fully described.

The framework 10 is provided with five transversely extending, rotatable shafts which, for purposes of convenient reference, are designated as the upper forward shaft 26, the lower forward shaft 27, the upper rear shaft 28, the lower rear shaft 29 and the lower intermediate shaft 30, the positional relation of these shafts being best shown in Figure 3.

The shaft 28 is journalled in a pair of aligned apertures 31 provided in the side plates 13, and each of the latter is also formed with a pair of open-ended recesses 32, adapted to receive split bearing blocks 33 in which the shafts 29 and 30 are journalled. The remaining shafts 26 and 27 are journalled in suitable complementary recesses formed in the adjacent faces of the members 22 and 24, as is best illustrated in the accompanying Figure 5.

It will be noted that the shafts 27, 29 and 30 are disposed in relative horizontal alignment and that the shafts 26, 27 and 28, 29 respectively, are vertically aligned.

Each of the shafts 26 to 30 inclusively, is provided medially of its length with an axially offset portion defining the inner crank 34.

The cranks 34 of the shafts 28, 29 and 30 are connected together for synchronized movement by means of a pitman designated generally by the reference character 35, the same consisting of a pair of adjacent straps 36, secured together by suitable bolts 37 and provided with suitable recesses in their adjacent faces to rotatably receive the cranks 34. This form of construction is similar to that already described in connection with the elements 22 and 24, and a further embodiment thereof is used in the form of the angle bracket 38 and the strap 39. The latter is secured to the former by means of the bolt 40 to embrace the crank 34 of the shaft 28 and the bracket 38 itself, is secured to the straps 36 by some of the aforementioned bolts 37.

Before proceeding with the description of the remaining structure of the pitman 35, it should be noted that the aforementioned bearing blocks 33 are retained in the recesses 32 by means of suitable keepers 41, the same being configurated substantially as shown and secured by the screws 42 to the side plates 13, as is best shown in Figure 2.

With further reference now to the remaining structure of the pitman 35, more particularly to the extension 43 of the same, this extension assumes the form of a pair of adjacent straps 44, 45, the same being secured together by means of the bolts 46 and connecting the cranks 34 of the shafts 26 and 27.

The extension 43 is flexibly connected to the pitman 35, this connection consisting of a horizontally disposed sector plate 47 formed integrally with the lower end of the strap 45 and provided with an arcuate slot 48. The slotted portion of the plate 47 is receivable between the sectionally relieved portions 49 provided at the forward extremity of the pitman 35, the latter also being provided with a bolt 50. The latter in turn, carries a friction sleeve 51 which engages the aforementioned slot 48, as is best illustrated in the accompanying Figure 3.

It will be apparent that in this manner the breast portion 12 may be effectively steered from side to side about the trunnions 20, 21, while at the same time the "drive" from the pitman 35 will be transmitted to the extension 43. The breast portion 12 is normally centered by means of a resilient rod 52, one end of which is pressed into a suitable aperture provided in the adjacent cross member 14, while its remaining end is anchored in a similar aperture formed in the upper trunnion 20, as is best shown in Figure 3.

It will be noted that the shafts 26 to 30 inclusively, protrude at both ends from the sides of the framework 10, each of the shafts 27, 29 and 30 being provided at each end with the outer crank 53. A pair of foot pedals 54 are rotatably positioned on the cranks 53 of the shaft 30, said pedals being retained in position by means of suitable cotter pins 55.

The cranks 53 of the remaining shafts 27 and 29 each carries a pair of washers 56 positioned on the sides of a leg strip 57. These strips will be hereinafter more fully referred to and each is provided with an elongated slot 58 through which the cranks 53 may freely pass and suitable cotter pins 59 are employed to retain the washers 56 and the associated strips 57 on the cranks.

One of the strips 57 is associated with each of the legs 60 by being positioned in a recessed slot 61 provided in the leg and secured therein by a suitable bolt 62, as shown in Figure 9. The slots 58 are disposed medially the length of the legs and the strips 57 are also formed adjacent the upper ends of the legs with circular apertures 63.

A circular boss 64 formed with an annular groove 65, is rotatably positioned in each of the apertures 63, these bosses in turn, being secured by the set screws 66 to the protruding ends of the shafts 26 and 28, this being shown in Figures 6 and 8. It will be noted that the bores 67 in which the shafts 26 and 28 are positioned are eccentrically disposed with respect to the bosses and the latter in this manner, constitute cams, the purpose of which will be hereinafter more fully set forth.

The body framework 10 may be suitably enclosed as indicated by the phantom lines 68, to define the contour of the animal's body, the head 69 of which, together with the associated breast portion, is secured to the upper trunnion 20. It will be noted that the latter is provided with a suitable aperture 70, adapted to receive a mounting pin (not shown) such as may pass transversely through the neck portion of the head 69. Suitable reins 71 are secured to the head adjacent the mouth, as is best illustrated in the accompanying Figure 1.

Having thus described the constructional details of the invention, its method of operation will now be presented.

The invention, when placed in operation, is operated by simply rotating the shaft 30 through the medium of the foot pedals 54, this action resulting in a synchronized rotation of the associated shafts 26, 27, 28 and 29.

These shafts in turn, will actuate the legs 60 by means of the cranks 53 and it will be noted that the latter are so relatively disposed, as to move the legs in accordance with the natural sequence of movement exhibited by a live animal. Similarly, the throw of the cam 64 on each leg is set in a predetermined relationship to the throw of the associated crank 53, whereby the leg as a whole, is alternately raised and lowered in synchronization with its forward and backward movement.

The animal may be steered, that is, guided in the required direction of travel, by either pulling in the conventional manner on one side of the reins 71 or, if desired, by pushing against one side of the head 69. Either action will cause relative movement of the breast portion 12 with respect to the body 11 and the animal will be found to travel along a curved path. When the application of the steering force is released, the spring rod 52 will automatically return the breast portion to the "straight ahead" position.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A mechanical walking animal comprising in combination, a hollow body, a forward shaft, an intermediate shaft and a rear shaft, said shafts being rotatably journalled in the sides of said body and protruding therefrom, an axially off-set portion medially the length of each of said shafts defining an inner crank, a pitman connecting said cranks, an outer crank at each of the protruding ends of said shafts, legs movably connected to said body and formed in the inner surfaces thereof with recessed slots, the outer cranks on said forward and rear shafts slidably and rotatably engaging said slots, foot pedals on the outer cranks of said intermediate shaft, and steering means associated with the forward of said legs.

2. The device as defined in claim 1 together with means for lifting and lowering said legs in synchronization with the walking movement thereof.

3. The device as defined in claim 1 together with means for lifting and lowering said legs in synchronization with the walking movement thereof, said means comprising in combination, further shafts rotatably journalled in said body and protruding on both sides therefrom, further axially off-set portions medially the length of said last-mentioned shafts defining additional inner cranks, said pitman also being connected to said last-mentioned cranks, and a cam at each end of each of said further shafts, said cams being connected to said legs.

4. A mechanical walking animal comprising in combination, a hollow body, upper and lower forward shafts, upper and lower rear shafts and a lower intermediate shaft, said shafts being rotatably journalled in said body and protruding on both sides therefrom, an axially off-set portion medially the length of each of said shafts defining an inner crank, a pitman connecting said cranks, forward and rear legs each formed with a recessed slot in the inner surface thereof adjacent its upper end, an outer crank at each of the protruding ends of said lower shafts, the outer cranks on said forward and rear lower shafts slidably and rotatably engaging said slots in said forward and rear legs respectively, foot pedals on the outer cranks of said intermediate shaft, a cam at each end of each of said upper shafts, each of said cams being connected to adjacent the upper end of one of said legs, and means for steering the forward of said legs.

5. The device as defined in claim 4, in which said means for steering comprises in combination, a pivotally connected breast portion on said body, said forward shafts being journalled in said breast portion, and a flexible connection on said pitman between said breast portion and said body.

6. The device as defined in claim 4, in which said means for steering comprises in combination, a pivotally connected breast portion on said body, said forward shafts being journalled in said breast portion, a flexible connection on said pitman between said breast portion and said body, and means for normally centering said breast portion.

7. A mechanical walking animal comprising in combination, spaced side plates and cross members forming a body, a breast portion and vertically disposed trunnion bearings connecting said portion to said body, said body and said portion defining a framework, upper and lower forward shafts rotatably journalled in said portion, upper and lower rear shafts and a lower intermediate shaft rotatably journalled in said body, said shafts protruding on both sides of said framework, an axially off-set portion medially the length of each of said shafts defining an inner crank, a pitman connecting said cranks on said rear and said intermediate shafts, a pitman extension connecting said cranks on said forward shafts, an outer crank at each of the protruding ends of said lower shafts, forward and rear legs each formed with a recessed slot in the inner surface thereof adjacent its upper end, the outer cranks on said forward and rear lower shafts slidably and rotatably engaging said slots in said forward and rear legs respectively, foot pedals on the outer cranks of said intermediate shaft, a cam at each end of each of said upper shafts, each of said cams being connected to adjacent the upper end of one of said legs, a flexible connection between said pitman and said pitman extension, and means for steering and centering said breast portion.

8. The device as defined in claim 7, in which said lower shafts are in relative horizontal alignment, and said upper and lower shafts are vertically aligned.

9. The device as defined in claim 7 together with split bearing blocks for said lower rear and intermediate shafts removably mounted in said framework, said last mentioned shafts being journalled in said blocks.

10. The device as defined in claim 7, in which said flexible connection comprises in combination, a bolt in the forward end of said pitman, a friction sleeve on said bolt, and a horizontally disposed sector plate on said extension, said sector plate being formed with an arcuate slot, and said sleeve slidably engaging said slot.

11. The device as defined in claim 7, in which said means for centering said breast portion comprises a resilient rod secured at one end thereof to said breast portion and at the remaining end to said body.

12. The device as defined in claim 7, in which the head of said animal is attached to said breast portion and said means for steering comprises reins connected to the mouth of said head.

FRANK A. MANFREDI.

REFERENCES CITED

The following references are of record in the file of this patent:

UNITED STATES PATENTS

| Number | Name | Date |
|---|---|---|
| 1,337,479 | Loomis | Apr. 20, 1920 |
| 1,369,628 | Dahl | Feb. 22, 1921 |
| 1,957,110 | Shaffer | May 1, 1934 |
| 2,120,102 | Kurelic | Oct. 8, 1937 |